United States Patent [19]
Crutcher et al.

[11] 3,742,769
[45] July 3, 1973

[54] GYROSCOPE

[75] Inventors: James E. Crutcher; Lawrence P. Davis, both of Phoenix, Ariz.

[73] Assignee: Sperry Rand Corporation, New York, N.Y.

[22] Filed: Mar. 25, 1971

[21] Appl. No.: 127,986

[52] U.S. Cl. ............................................. 74/5 R
[51] Int. Cl. ................................................ G01c 19/00
[58] Field of Search ........................... 74/5, 5.7, 5.8

[56] References Cited
UNITED STATES PATENTS

| | | | |
|---|---|---|---|
| 2,969,682 | 1/1961 | Schoeppel et al. | 74/5 X |
| 3,043,147 | 7/1962 | Will, Jr. | 74/5 |
| 3,248,952 | 5/1966 | Beach | 74/5 |

FOREIGN PATENTS OR APPLICATIONS

| | | | |
|---|---|---|---|
| 707,421 | 6/1941 | Germany | 74/5 |
| 347,777 | 8/1960 | Switzerland | 74/5 |

Primary Examiner—Manuel A. Antonakas
Attorney—S. C. Yeaton

[57] ABSTRACT

A gyroscopic rotor designed to increase the inertia to weight ratio and which may be defined as an inertial rim supported by two thin walled spherical shells. A thin walled hollow cylindrical shaft separates and supports the shells and provides axial rigidity to prevent oscillation or misalignment of the rim in respect to the axis of rotation.

19 Claims, 2 Drawing Figures

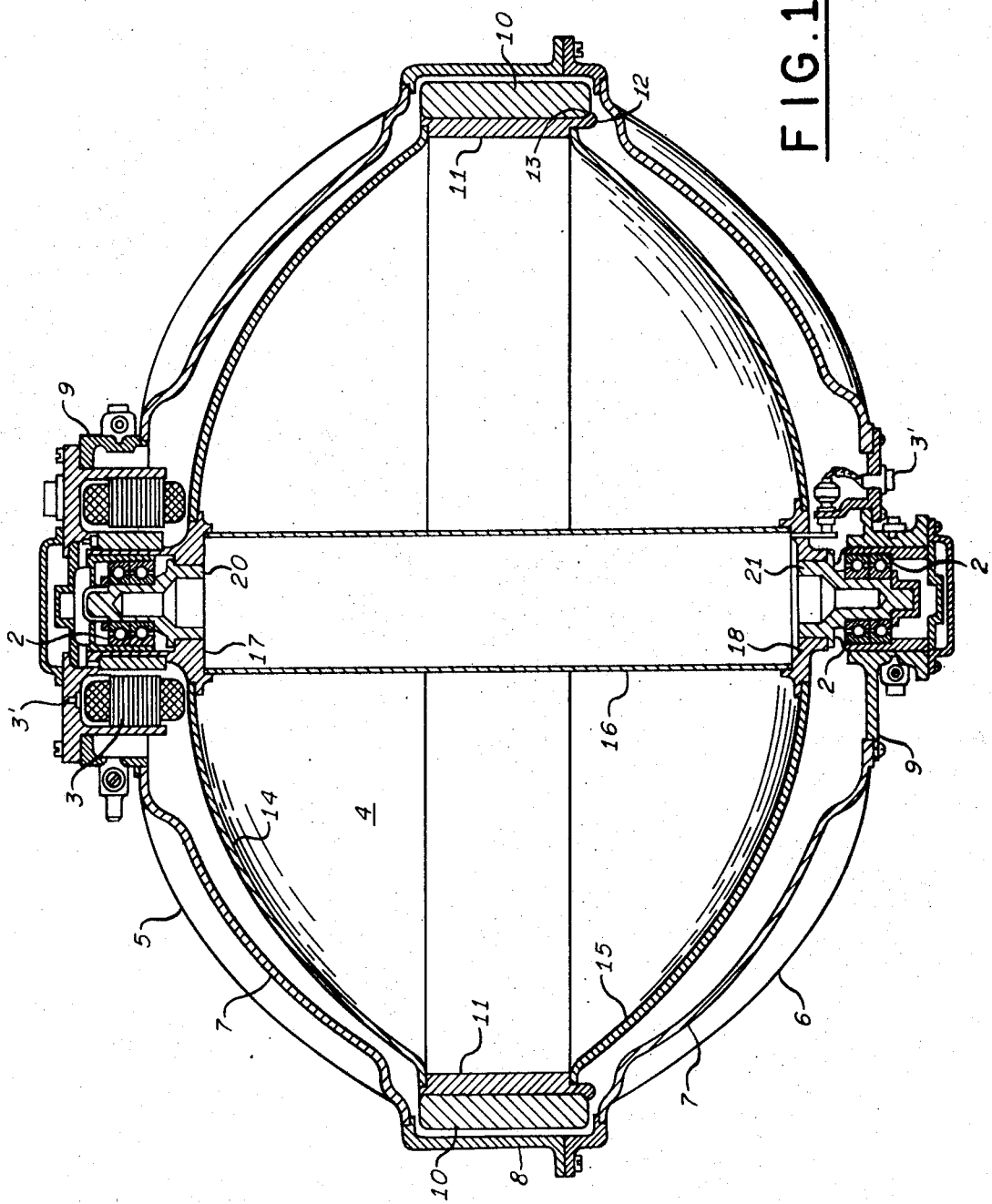

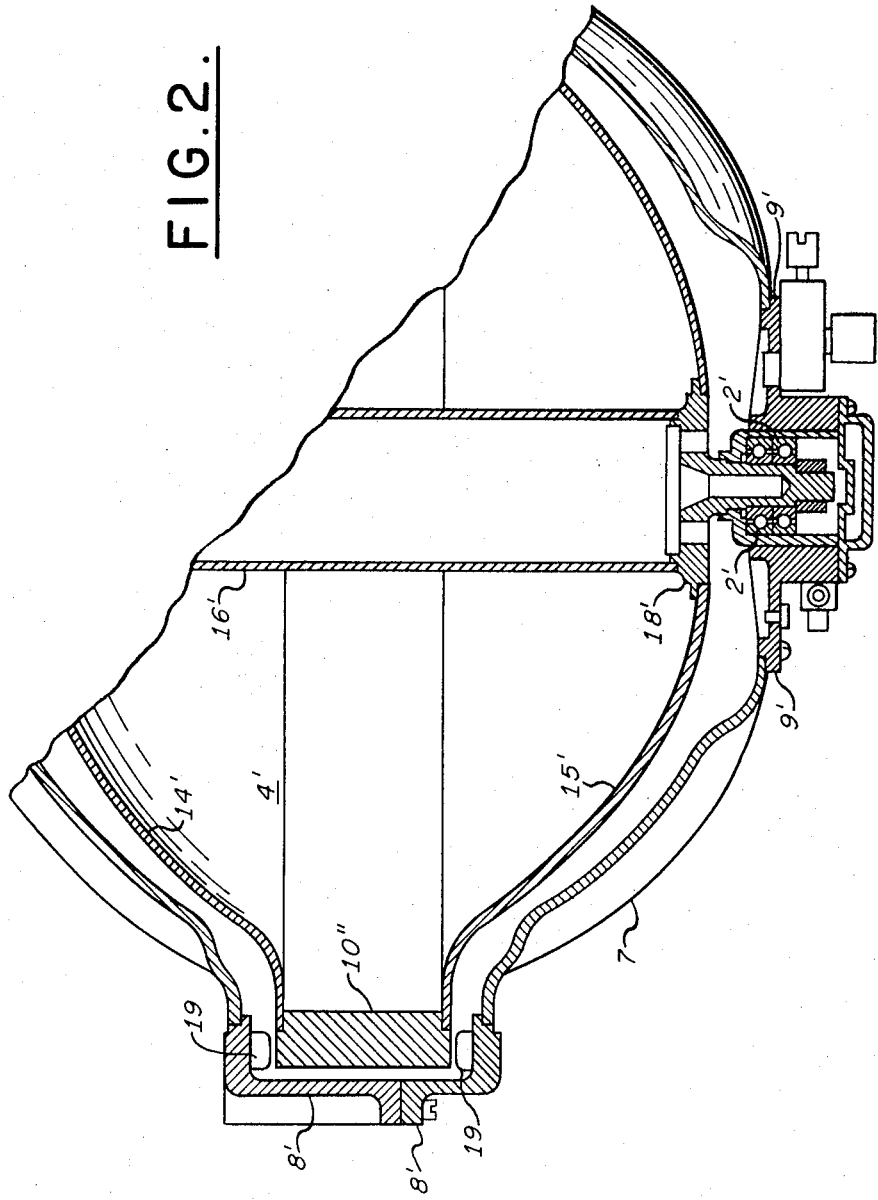

GYROSCOPE

BACKGROUND OF THE INVENTION

1. Field of the Invention

The invention relates to the design of gyroscopic rotors particularly adaptable to vehicle stabilizing gyroscopes, sometimes referred to as control moment gyroscopes for stabilizing space vehicles.

2. Description of the Prior Art

It is well known that the requirements for a high performance gyroscope reside principally in a high angular momentum of the gyroscope rotor and in the fixity of balance of the rotor and rotor case or rotor bearing frame about its supporting or gimbal pivot axis. The former is obtained by high speed and optimum distribution of mass of the rotor about its spin axis, i.e., a high moment of inertia; and the latter by the symmetrical construction of both the rotor and its supporting frame or rotor bearing frame about the pivot or tilt axis. Priorly, some rotors were constructed in the shape of a spoked wheel. These rotors suffered from several defects. The spokes had to be strong and therefore usually heavy to resist misalignment of the rotor during an applied torque situation. The added weight closer to the axis of rotation reduced the inertia to weight ratio. Windage loss was also a problem. In a high torque situation, the rim tended to distort due to the non-uniform transfer of torquing force through the individual spokes. The use of a disc in place of the spokes overcame the windage and torque transfer problems but could only overcome the misalignment of the rotor problem at the expense of added weight without an increase in the inertia to weight ratio. Rotors using either the spoke or disc configuration tended to be too hard and rigid to absorb any axial force imposed on the rotor and thereby they could overload and damage the rotor bearings. A gyroscope, such as taught in U.S. Pat. No. 3,248,952, filed Jan. 24, 1961, entitled "Gyroscope" and assigned to the instant assignee, tends to prevent overloading of the rotor bearings due to an axial force. However, this design of dual discs supporting each side of the rim will not be particularly resistive to an axial vibration and the rim may distort or begin to oscillate.

SUMMARY OF THE INVENTION

The rotor of a gyroscope is constructed with a rim supported on a supporting member, or web, and shaft assembly. The rim, usually of steel, serves as the payload in supplying a large inertia mass. The supporting web is comprised of two smooth, relatively light weight, shells attached at their outer peripheries to the rim and at their center to the shaft assembly. The shell attachment may be by direct weld to the rim or by a weld to an intermediate rim, which in turn supports the inertial rim.

In the latter configuration, which may be termed a bimetal configuration, a steel rim is temperature fitted to an intermediate rim of aluminum and secured in place by swaging a lip of the aluminum rim around the edge of the steel rim to prevent relative axial movement between the rims. The shaft assembly may include a relatively thin walled hollow aluminum cylinder welded to an aluminum hub at each end. The aluminum shells may be welded to the respective aluminum hubs. The hubs are then bolted to steel bearing shafts and suitably journalled in the rotor bearing frame. In another configuration, the rim, shells and shaft assembly are all of steel and form a single homogenous unit.

A primary advantage of the invention is to provide a rotor having a high inertia to weight ratio.

Another advantage of the invention is to provide uniform stress distributions on the rotor rim during high external or commanded torque conditions.

Another advantage of the invention is to provide stiffness in the rotor support member to prevent oscillation and misalignment of the rotor rim during high torque conditions.

Another advantage of the invention is to provide a means for reducing the windage drag of the rotor support member.

Another advantage of the invention is to provide a large bearing span for the rotor spin axis and minimum weight separation structure for maintaining bearing preload.

Another advantage of the invention is to provide means for absorbing axial loads in the rotor supporting member to prevent axial overloading of the bearings due to vibration environments.

Another advantage of the invention is to provide a rotor assembly which does not require the welding of dissimilar materials.

BRIEF DESCRIPTION OF THE DRAWINGS

FIG. 1 illustrates the complete gyroscope assembly including the housing, the rotor and the peripheral equipment associated with the rotor; and FIG. 2 illustrates a modification of the rim attachment to the rotor shells.

DESCRIPTION OF THE PREFERRED EMBODIMENT

In FIG. 1 there is shown the housing 1, including bearings 2 and drive motor 3, enclosing the rotor 4. The primary function of the housing 1 is to support the rotor 4. Thus, it must be able to withstand precession torques, external pressure (as the rotor operates in a near vacuum), environmental shock and vibration. Each of these loadings requires a high strength design with high structural stiffness. The dimpled housing, as shown, provides the optimum configuration to meet these requirements. In more detail, the housing 1 is comprised of two spherical segments 5, 6 formed from aluminum. The segments 5, 6 have radial dimples 7 to increase the stiffness and lower the stresses due to the pressure differential between the inside and outside of the housing 1. The aluminum also provides a high heat transfer coefficient and a high damping coefficient to minimize vibrations and acoustic noise levels. Each segment may be welded to an outer ring 8 and an inner hub 9. The welding may be done by the electron beam process to provide a leak tight joint, minimum distortion and high weld efficiencies. The housing 1 should be made of an aluminum alloy which permits machining, welding, and artificial aging after welding to stress relieve and harden the material to its full strength. After aging, the housing 1 is machined as a matched assembly to maintain bearing bore concentricity and orthogonality of the spin axis and gimbal axis.

In addition to providing a low pressure enclosure, the housing 1 supports and maintains alignment of the spin bearings 2 to enhance the operating life of the bearing. It further provides mounting interfaces for the brushless d.c. spin motor 3 and the monitors for speed pickoff, bearing temperatures, bearing vibrations, internal pressure, etc. (shown collectively as 3' in FIG. 1).

The rotor 4, the heart of the control moment gyroscope, may be a bimetal design having a steel rim supported by a lightweight aluminum web and shaft assembly. The rotor configuration is designed to incorporate the following characteristics: large inertia to weight ratio; high rotor stiffness; high strength design; and high balance stability. The large inertia to weight ratio is achieved by distributing the maximum amount of mass toward the periphery of the rotor 4. The steel rim 10 serves as the peripheral mass and supplies the desired large inertia. In one design, (FIG. 1) the steel rim 10 was temperature fitted into an aluminum rim 11 and secured in place by swaging a lip 12 around the steel rim edge 13. This interference fit served to place the aluminum rim 11 into compression for no rotation so that the unit could rotate at a higher ultimate speed without yielding.

The aluminum rim 11, is welded to each of two shells, 14, 15 which position the rim about the axis of rotation. These shells may be constructed of aluminum so that the weight of the material at the smaller diameters is minimized. The high rotor stiffness is obtained by the rigid spherical structure defined by the shells 14, 15. The shaft assembly, comprising a hollow aluminum cylinder 16 and aluminum hubs 17, 18 attached to each end, is disposed between and connected to the center portions of the shells 14, 15. The widely separated points of shell attachment to the shaft assembly provides high structural rigidity. A steel shaft 20 is bolted to hub 17 and steel shaft 21 is bolted to hub 18 and each is journalled in bearings 2. This shaft assembly acts as a rigid column providing considerable resistance to bending moments. The rigid column transfers torque loads to in-plane loads on the shells 14, 15 wherein the latter exhibit their greatest advantage.

FIG. 2 illustrates a variation of the rotor design. The steel rim 10'' is welded directly to steel shells 14', 15'. Each of the shells 14', 15' is welded to a steel hub such as journalled hub 22. Each of the hubs are welded to and separated by a steel shaft 16'. The hubs may each include a shaft journalled within bearings 2', or a shaft may be bolted to the hubs as shown in FIG. 1. An advantage of this design over the bimetal design is that of higher inertia and rotation speed for comparable sized units. Where the inertia to weight factor is critical, the bimetal design is superior. Thus, the choice for incorporating either unit is dependent upon which criteria are paramount.

Control moment gyroscopes designed for space applications require not only good design considerations of weight versus performance, but each component must be individually tested for high quality, low tolerance criteria. The method of combining and/or attaching the components to one another is similarly critical. High strength is built into the instant design through welding by an electron beam welding process. This process lends itself to environmental control and offers good quality, repeatability, and high efficiency welds. All of the joints are butt welds, with sufficient backing material to prevent burn through. This aids in minimizing gaps resulting in better welds, and low distortion due to shrinkage. After aging, the physical properties of the weld are essentially that of the parent material.

The design as shown in either FIG. 1 or FIG. 2 is symmetrical and of uniform structure resulting in a well distributed load pattern. Thus, any distortion or stress concentration that might arise due to inhomogeneity of the supporting structure is obviated. As the largest mass of the rotor 4 or 4' is concentrated at the rotor periphery, the material can be selected and designed to support the greatest centrifugal load. In operation, the steel rim 10 is in fact self supporting in that none of the centrifugal load exerted by it is supported by the shells 14, 15. In fact, the shells 14, 15 simply position the rotor 4 in respect to the shaft assembly during a spinning but no precession torque situation. During a torquing operation, however, the shells 14, 15 do coact and transfer the force between the steel rim 10 and the shaft assembly. Thus, the shells 14, 15 must be sufficiently rigid to effect this coaction. The design of the curved shell at the points of attachment is such that the torque force will act essentially in the plane of the shell at the points of attachment. Substantial strength and rigidity is thereby available to transfer this force.

In axial vibration situations, the axial force may distort and/or damage the bearings 2 unless the force is limited to less than the critical value. Usually, the amount of force itself cannot be reduced as the occurrence is generally only during lift off of the spacecraft prior to placing the control moment gyroscope into orbit. Recognizing this limitation on controlling the force, the design of the rotor 4 had to be such as to prevent any damage to the bearings 2. The configuration of the shells 14, 15 is such that an axial force tending to cause a relative axial displacement between the rim 10 and the shaft assembly will tend to bend each shell close to its point of attachment to the shaft assembly. The design of the shell is further implemented so as to permit bending for any axial force somewhat smaller than the axial force which will cause damage to the bearings 2. Recognizing that aluminum has a relatively low coefficient of elasticity only a limited amount of bending is permissible. For an axial force situation exceeding these limits, another means must be utilized to prevent damage to the bearing assembly. Stops 19, as shown in FIG. 2, permit the rim to move axially within tolerances defined by the bending limits. When these limits are exceeded, the rim will contact the stop 19. The axial force tending to axially misalign the rim 10 and the shaft assembly cannot damage the bearings 2 as the maximum axial misalignment is thus limited.

Although the shells have been described in terms of being comprised of aluminum or steel it is to be understood that other materials may also be used without departing from the benefits obtained due to the configuration of the shells. In some situations depending on the size of the rotor, weight, etc., presently known plastics or fiberglass type materials may be used scccessfully; it may also be assumed that exotic future materials may be suitable. Similarly, the rim is not intended to be limited to a steel or steel and aluminum configuration. Other known or unknown materials may be or may become suitable for this purpose, and provide all or even more benefits than the presently described configurations.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A gyroscopic device including a housing and a rotor adapted to spin about an axis wherein said rotor comprises
    an inertial rim,
    a pair of opposed, convex, thin-walled, shell-like support members of generally resilient material, each of said members being attached at its periphery to said rim,
    a hollow cylinder disposed between each of said members and secured thereto at their apexes for axially spacing said members from one another, and
    bearing means at said apexes for mounting said rotor for spinning about said axis in said housing, said convex resilient support members providing high axial rigidity for accurately transferring gyroscopic forces acting on said rotor to said housing but providing radial compliance for permitting radial expansion of said inertial rim under the influence of centrifugal force.

2. The gyroscopic device as claimed in claim 1 including
    a pair of hubs, each said hub being disposed at the apex of said members, and wherein said cylinder and said members are welded to said hub.

3. The gyroscopic device as claimed in claim 2 wherein
    said rim, said members and said cylinder are comprised of the same material.

4. The gyroscopic device as claimed in claim 3 wherein said rim, said members, said cylinder and said hubs are welded at their respective points of attachment to form an integral structure.

5. The gyroscopic device as claimed in claim 2 wherein said mounting means comprises
    a pair of journal members, each said journal member being attached to one of said hubs, and
    each said journal member being mounted within said bearing means, whereby said integral structure is supported by said bearing means.

6. The gyroscopic device as claimed in claim 1 wherein
    said members comprise imperforate and generally smooth surfaces whereby the drag due to windage is reduced.

7. The gyroscopic device as claimed in claim 1 wherein the point of attachment of said rim and said support members is free of any other connecting members.

8. The gyroscopic device as claimed in claim 1 wherein said housing comprises a rim and a second pair of generally shell-like, thin walled members corresponding in shape to said rotor rim support members and having disposed therein a plurality of generally radial depressions for increasing the rigidity of said housing.

9. The gyroscopic device as claimed in claim 8 wherein said housing rim includes at least one pair of stop means for limiting the axial movement of said rotor to a prescribed distance under high stress conditions.

10. A gyroscopic device including a housing and a bimetallic rotor wherein said rotor comprises
    a first rim of high strength high density material,
    a second rim of different material attached to said first rim, said first rim being thermally fitted on said second rim whereby said second rim is under a compressive force at normal operating temperatures,
    a pair of convex, thin-walled, shell-like radial support members attached to said second rim for radially and compliantly supporting said second rim, whereby in normal operation said rim may expand to follow any expansion of said first rim,
    a hollow cylinder disposed between said support members for axially spacing said radial support members from one another, and
    bearing means for mounting said rotor within said housing.

11. The gyroscopic device as claimed in claim 10 wherein
    the peripheral edge of said radial support members are welded to said second rim, whereby said radial support members support said first and second rims about the axis of rotation of said rotor.

12. The gyroscopic device as claimed in claim 11 wherein
    said second rim has a rigid flange on one side for engaging said first rim, and
    said second rim has a malleable portion about its other side and swaged against said first rim, whereby to cage said first rim between said flange and swaged portion of said second rim.

13. The gyroscopic device as claimed in claim 12 wherein the point of attachment of said first rim, said second rim and said radial support members is free of any other connecting members.

14. The gyroscopic device as claimed in claim 12 wherein
    said radial support members have disposed therein an aperture about their respective axial centers,
    a pair of hubs of material similar to that of said radial support members, and
    each of said hubs is welded to one of said radial support members at the edge of said apertures.

15. The gyroscopic device as claimed in claim 1 wherein
    said cylinder is welded to each of said hubs, whereby said hubs and the centers of said radial support members are axially spaced from one another.

16. The gyroscopic device as claimed in claim 15 including
    a pair of shafts, each said shaft being mechanically attached to one of said hubs, and
    said shafts operably associated with said bearing means, whereby said rotor is free to rotate within said housing.

17. The gyroscopic device as claimed in claim 10 wherein
    said radial support members comprise imperforate and generally smooth surfaces, whereby the drag due to windage is reduced.

18. The gyroscopic device as claimed in claim 10 wherein said housing includes
    a pair of generally shell-like means for enclosing said rotor, and
    said enclosing means is constructed to include a plurality of dimple like depressions, whereby the rigidity of the enclosing means is decreased.

19. The gyroscopic device as claimed in claim 10 wherein
    said housing includes a set of bearings for mounting said rotor, whereby said rotor is free to rotate within said housing.

* * * * *